United States Patent Office 3,784,557
Patented Jan. 8, 1974

3,784,557
PHOTOTROPIC 2,4,5-TRIPHENYLIMIDAZOLYL RADICALS AND DIMERS THEREOF
Lawrence Anthony Cescon, Wilmington, Del., assignor to E. I. du Pont de Nemours and Company, Wilmington, Del.
No Drawing. Continuation-in-part of application Ser. No. 388,010, Aug. 6, 1964, which is a continuation-in-part of application Ser. No. 181,475, Mar. 21, 1962, both now abandoned. This application Mar. 10, 1967, Ser. No. 622,085
Int. Cl. C07d 47/36
U.S. Cl. 260—309                                    33 Claims

ABSTRACT OF THE DISCLOSURE 2,4,5-triphenylimidazolyl radicals and their dimers (2,2',4,4',5,5' - hexaphenyl biimidazoles) having on the phenyl groups from 1 to 10 substituents free from a hydrogen atom capable of reacting with methyl magnesium iodide, one such substituent being in the ortho position on the 2-phenyl group and having a sigma value below 0.7. The 2-phenyl group can contain up to four substituents, while the 4 and 5 phenyl groups can contain up to three substituents each.

The radicals and the dimers are stable and form a photochromic system, finding utility as components in sun shields or shades.

They are prepared by oxidizing the corresponding substituted 2,4,5-triphenylimidazole to form the biimidazole which is dark stable. The radical forms upon exposure of the biimidazole to a light source and is stable in the presence of the light radiation.

CROSS-REFERENCES TO RELATED APPLICATIONS

This application is a continuation-in-part of application Ser. No. 388,010, filed Aug. 6, 1964, and now abandoned which was a continuation-in-part of now-abandoned application Ser. No. 181,475, filed Mar. 21, 1962.

BACKGROUND OF THE INVENTION (1) Field of the invention

This invention relates to novel imidazolyl and biimidazole compositions of matter. More particularly, it concerns selectively substituted 2,4,5-triphenylimidazolyl radicals and their dimers.

(2) Description of the prior art

Substances which change color upon exposure to light and return to their original color after the light source is removed are called phototropic substances. An example is the oxidation product of lophine (2,4,5-triphenylimidazole) which upon exposure to actinic radiation changes color from a light lemon yellow to a reddish purple. This and other phototropic materials have not been widely used, however, because they possess certain disadvantages, e.g., they are slow in reverting back to their original color; the color is fixed, i.e., no variation in color can be obtained; only a comparatively low number of color reversals is attained before compound failure; or they are adversely affected by heat.

The foregoing deficiencies of known phototropic materials are overcome by the novel compositions of this invention.

SUMMARY OF THE INVENTION

The novel compositions of matter of this invention are 2,4,5-triphenylimidazolyl radicals having certain substituents in at least the ortho position of the 2-phenyl ring, and their dimers. These novel compositions are represented by the formulas:

(I) 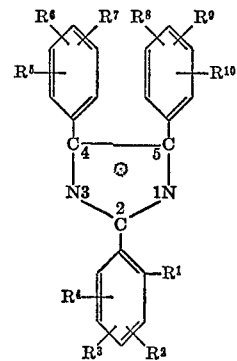

wherein $R^1$ is a substituent free from a hydrogen atom capable of reacting with methyl magnesium iodide, and has a sigma value below 0.7;
$R^2$ through $R^{10}$ are each selected from the class consisting of hydrogen and a substituent free from a hydrogen capable of reacting with methyl magnesium iodide;
with the proviso that any two $R^1$ through $R^{10}$ substituents in adjacent positions on the same phenyl ring can be joined together to form a benzo group; and
with the proviso that only one of $R^5$ through $R^7$ and only one of $R^8$ through $R^{10}$ can be in a position ortho to the phenyl carbon that is attached to the imidazolyl group;

and (II) 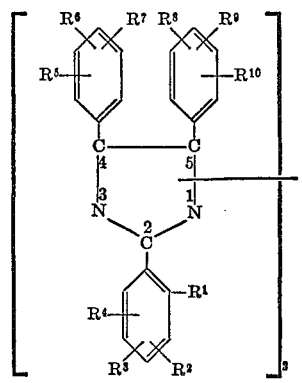

wherein $R^1$ through $R^{10}$ are defined as above; and wherein the two imidazolyl rings are joined through a single bond and the remaining valences of the 3 carbon atoms and the 2 nitrogen atoms of each ring are satisfied by two conjugated double bonds.

It is an essential limitation that the novel compositions of this invention contain the $R^1$ substituent in the ortho position of the 2-phenyl group. For it is the presence of this group in the ortho position that distinguishes said compositions of this invention over art imidazoles and biimidazoles by imparting one or more of the following properties to said compositions: (1) the dissociation temperature is raised; (2) they exhibit a surprisingly fast color change when exposed to or removed from light; (3) they can be subjected to a high number of color reversals; (4) they are surprisingly stable.

Thus, the compositions of this invention are useful as automatic sun shades or shields in coating glass or other transparent objects, in the inner layer of laminated glass, or as solutions in solvents to give decorative effects.

DESCRIPTION OF THE INVENTION

(1) Introduction

The relationship between the imidazolyl radicals and the biimidazole compounds of the invention lies in the fact that together they comprise a photochromic system. That is, the biimidazoles, on exposure to activating light radiation, such as sunlight or ultraviolet light, dissociate to form the radicals which are stable in the presence of the radiation; and the radicals dimerize to reform the biimidazoles when the radiation is removed. The photochromic properties of the system arise because the biimidazoles and the corresponding imidazolyls are differently colored. The following equation illustrates the reversibility of the system, wherein $L-L$ is the biimidazole (dimer) and $L\cdot$ is the imidazolyl radical monomer):

(1) 

(2) Preferred embodiments

Representative substituents free from a hydrogen capable of reacting with methyl magnesium bromide include alkyl, alkoxy, alkoxycarbonyl, alkylthio, dialkylcarbamoyl, dialkylsulfamoyl, alkanoyloxy, N-alkylalkanamido, aryl, aryloxy, arylthio, benzo, halo or cyano groups. The alkyl and alkoxy groups above, whether alone or as a part of another group, e.g., alkylthio, can be of any chain length but are preferably lower alkyl or lower alkoxy, i.e., of 1-6 carbon atoms. Examples of such groups include methyl, ethyl, propyl, butyl, isobutyl, sec.-butyl, tert.-butyl, pentyl, isopentyl, hexyl, ethoxy, pentoxy, isobutyloxy, and the like. The alkanoyl and alkanamido-containing substituents can also be of any chain length, but are preferably lower alkanoyl or alkanamido, i.e., of 1-6 carbon atoms. Representative groups range from formyl to caproyl and from formamido to caproamido, respectively. The aryl and aryl-containing groups preferably contain 6-10 carbon atoms and are exemplified by phenyl, 1-naphthyl, 2-naphthyl, and the like. Halo substituents include bromine, chlorine and fluorine.

The definition of $R^1$ specifies a sigma value below 0.7. By the term "sigma value" or "constant is meant the value obtained for the substituent in the para position of benzoic acid and its derivatives as discussed and illustrated by H. H. Jaffe, Chem. Rev. 53, 191 (1953), particularly pp. 219–223 and column 5 of Table 7 on p. 222. Preferred $R^1$ substituents are alkyl, alkoxy, chloro, bromo or fluoro. In addition, $R^1$ taken together with any one of $R^2$ through $R^4$ appearing ortho to $R^1$ can be benzo, i.e., —CH=CH—. These same immediately foregoing groups that are preferred as $R^1$ groups are also preferred groups for $R^2$ through $R^{10}$; however, more preferably the $R^2$ through $R^{10}$ groups are hydrogen; most preferably, $R^2$ through $R^{10}$ are alkoxy, especially lower alkoxy in the meta-position of the 4- and 5-phenyl rings.

Preferably, also, the 2-phenyl ring carries only one ortho-substituent; namely, the $R^1$ substituent.

Substituents having a hydrogen capable of reacting with the Zerewitinoff reagent, called an active hydrogen, should be avoided because compositions containing them are either non-phototropic, have a low order of phototropism, or are readily converted to non-phototropic substances. Examples of these undesirable groups include hydroxyl, thiol, carboxyl, amino and alkylamino.

The biimidazole dimers of the invention comprise two imidazolyl radicals connected at the 1-1′, 1-2′, 1-4′, 2-2′, 2-4′ or 4-4′ positions. The imidazolyl radicals can combine to form the dimer linked at any one of the above-listed positions, the particular position being dependent upon the thermal conditions under which dimerization occurs. Because of its thermal stability at room temperatures, e.g., 20-27° C., the 1-2′ dimer is preferred.

(3) Preparation

The biimidazoles of this invention are prepared by oxidatively coupling the corresponding triphenylimidazole. One suitable oxidation method utilizes the procedure described by Hayashi et al. in Bull. Chem. Soc. Japan, 33, 565 (1960) wherein the substituted triphenylimidazole in ethanolic potassium hydroxide is treated with aqueous potassium ferricyanide. The dimeric product precipitates and is isolated by filtration and washed free of ferricyanide with water.

Another method involves oxidation with halogen such as chlorine, bromine or iodine in the presence of alkali; for example, treating the potassium salt of the imidazole with iodine in ether as disclosed for other imidazoles by Zimmerman et al., Angew. Chem., 73, 808 (1961).

A third oxidation method is the anodic oxidation of the imidazole in dimethylformamide or acetonitrile containing a supporting electrolyte such as alkali metal chlorate.

Difficulty may be encountered in the dimerization if the triphenylimidazole contains more than two substituents having sigma constants of 0.7 and above. The dimers obtained, however, are phototropic compounds.

It should be noted that where the preparative method involves realtively low temperatures and the biimidazole (dimer) is substantially insoluble in the reaction medium as in the above Hayashi et al. procedure, the product precipitates as formed. Sometimes the crude product comprises mixtures of biimidazoles and may contain one or more biimidazoles that are relatively easily dissociated by heat, such as, for example, the 4,4′-isomer. Such thermal instability is, in general, more readily apparent in the liquid, e.g. in solution, than in the solid. Thus whereas the solid dimer may be essentially uncolored, i.e. undissociated at room and ordinary storage temperatures, it may become extensively colored, i.e. dissociated to imidazolyl radicals, almost immediately on being dissolved in an inert solvent such as benzene. As the radicals in solution are in equilibrium with all possible dimeric structures, in time, in the absence of exciting light radiation, the radical color fades as the radicals dimerize to biimidazoles that are not thermally dissociable at that temperature in the particular solvent used. In other words, on equilibration, the system tends to produce biimidazoles that are thermodynamically stable at the temperatures employed. Thus no matter which of the above methods is used to oxidize a particular imidazole, substantially the same dimeric product is obtained on recrystallization under the same conditions. The 1,2′-isomer is such a product, obtained under the conditions described in Example 1.

If it is desired to recrystallize the product, suitable solvents include benzene, ethyl ether, methanol, ethanol, cyclohexane, and the like. In general, allowing the biimidazole product to crystallize at ordinary, e.g., room temperatures from the recrystallization solvent yields a product which comprises at least one isomer, such as the 1,2′-dimer, which is thermally stable at the solution temperatures employed. Prior workers in the art assigned the 1,1′-structure to the various dimers prepared in the above chemical oxidation methods. They gave no structure proof, however, so that the 1,1′ designation is arbitrary and seems based on the following argument: That starting imidazole hydrogen is normally positioned on nitrogen (though it is known that it may also tautomerically exist on anyone of the three imidazole ring carbons). Therefore, since this hydrogen is lost in the oxidative coupling (dehydrogenation) to dimer, it seemingly follows that two imidazole nitrogens which formerly bore the hydrogens are joined to each other in the dimer. In contrast, however, the crystallographic study described herein under Example 6 indicates that the present products obtained by the ferricyanide oxidation method and subsequently purified as described have the 1,2′ structure. Thus it is reasonable to conclude that the prior art products, having been made by essentially the same method, also have the 1,2′ rather than the disclosed 1,1' structure, or both. The position of the bond joining the imidazole rings in the invention compounds is, however, immaterial to the broad aspect of this invention in that the fast radical recombination rate is independent of such bonds as discussed below.

The imidazolyls of this invention are prepared by subjecting the corresponding biimidazole to photolyzing light. This procedure is described in further detail below.

Dimers that differ in how the imidazole rings are joined may be interconverted photolytically, for example, by irradiating a particular dimer, e.g. the 1,2'-isomer discussed above, in solution, with photolyzing light, and allowing the imidazolyl radicals to recombine in the dark at another (higher or lower) temperature (Equation 1 above). This other temperature should, of course, be below the dissociation temperature of the isomer to be recovered. For example to prepare dimers which may have relatively low thermal stability in solution, e.g. dissociate in the dark at room temperatures under proper conditions, a thermally more stable, but photochromic, dimer solution is cooled to a lower temperature, e.g. −80 to +10° C., and irradiated to effect dissociation. The resulting radicals are then allowed to recombine in the dark at such low temperature. The process can be repeated on the same solution as may be necessary, to eventually build up substantial proportions of the new dimer. Isomers thus produced may be recovered at temperatures at which they are thermally stable using techniques well known to those skilled in the art of preparative chemistry; for example, the dimer may be precipitated from the carrier solvent by adding one or more other solvents, e.g. petroleum ether, which is miscible with the carrier solvent but which is essentially a non-solvent for the biimidazole; or the dimer may be allowed to crystallize from the solvent at the indicated or still lower temperatures; or the solvent may be removed from the biimidazole, as by distillation, including at reduced pressures where necessary. The product may be characterized by the methods mentioned below. As indicated above the dissociation temperature for a particular dimer is generally higher for the solid than the liquid state so that quite often even the so-called thermally unstable dimers may be stored and used solids at room temperature.

Similarly triarylimidazolyl radicals formed by dissociating a particular dimer at one temperature can be warmed to higher temperature in a suitable inert solvent, which temperature is above the theraml dissociation temperature of the starting dimer but below the thermal dissociation temperature of another, more thermally stable isomer, then the radicals are allowed to recombine at said higher temperature, to produce the more stable isomer.

The substituted triphenylimidazoles used in the oxidation procedures to prepare the biimidazoles of this invention can be prepared by refluxing, in glacial acetic acid containing ammonium acetate, benzil with an appropriately substituted benzaldehyde or a benzil and benzaldehyde which are both suitably substituted, then drowning the reaction mass, e.g., in water, in an ammonium hydroxide solution, etc., filtering and purifying the product by recrystallization, as described by Davidson, et al. in J. Org. Chem., 2, 319 (1937); or by refluxing a benzoin and a benzaldehyde in methanol in the presence of copper acetate and ammonia, an adaptation of the procedure of Wiedenhagen et al., Ber. 70, 570 (1937); or by heating a benzil and a benzaldehyde at 180° to 190° C. in formamide as disclosed in Belgian Pat. 589,417.

(4) Specific illustrations

The invention is further illustrated by the following examples which are not intended to be limiting but which describe in detail the novel compositions and their preparation. Parts are given by weight unless otherwise stated.

EXAMPLE I

To 2.1 parts of benzil (0.01 mole) dissolved in 50 parts of glacial acetic acid containing 6 parts of ammonium acetate (0.078 mole) was added 1.4 parts of o-chlorobenzaldehyde (0.01 mole), and the solution was refluxed for 2 hours. The solution was then drowned in 200 parts of cold water whereupon 3.1 parts of reaction product precipitated. The product was isolated by filtration and purified by recrystallizing twice from ethanol. The product, 2-(o-chlorophenyl)-4,5-diphenylimidazole, is a white crystalline solid having a melting point of 196° to 197° C. and the following analysis:

Calculated (percent): C=76.3; H=4.6; N=8.5. Found (percent): C=76.7; H=4.7; N=8.2.

To 1.1 parts of the above prepared imidazole dissolved in 100 parts of ethanol containing 12 parts of potassium hydroxide was added 450 parts of a 1% by weight water solution of potassium ferricyanide at a rate of 5 parts per minute for 1.5 hours with continuous stirring. The oxidation reaction product in an amount of 1.0 part precipitated from the reaction mixture, was isolated by filtration, and was washed with water until free from ferricyanide. The porduct was dried at 56° C. for eight hours at 0.1 mm. mercury pressure after predrying overnight in a vacuum oven at 50° C. It was solvated with two moles of ethanol for every three moles of biimidazole. The product 2,2'-bis (o-chlorophenyl)-4,4',5,5'-tetraphenyl-1,2'-biimidazole is a pale yellow crystalline solid which softens at about 90° C. and melts to form a yellow gel at 95° to 110° C. The compound turns lavender at 170° C., becomes red-brown at 190° C. and at 220° C., it becomes red.

Analysis for the solvated biimidazole.—Calculated (percent): C=75.4; H=4.7; N=8.1. Found (percent): C=75.9; H=4.7; N=8.1.

A portion of the ethanol-solvated product was dried azeotropically with cyclohexane to produce non-solvated material. Recrystallization from ether also yields the non-solvated product, M.P. 205° C.

The biimidazole, after recrystallization from methanol, has the following crystallographic characterization:

Monoclinic elementary cell with $a$=33.742 A., $b$=11.438 A., $c$=35.444., $\beta$=93.5°.

Space group $I2/a$.

An X-ray density of 1.283 g./cm.³ is calculated for 16 dimer molecules per elementary cell.

X-ray powder diffraction data for the product is found in the following Table I.

TABLE I

Interplanar spacings, $d$ (A.), and estimated intensities, $I_o$, of the power diffraction pattern of $C_{42}H_{28}N_4Cl_2$ after recrystallization from methanol

| $d$ (A.): | $I_o$ |
|---|---|
| 9.891 | 41 |
| 9.158 | 57 |
| 8.864 | 100 |
| 8.412 | 51 |
| 8.070 | 34 |
| 7.682 | 7 |
| 7.433 | 33 |
| 6.788 | 11 |
| 6.626 | 25 |
| 6.306 | 48 |
| 5.960 | 38 |
| 5.798 | 31 |
| 5.641 | 26 |
| 5.451 | 10 |
| 5.220 | 28 |
| 5.125 | 36 |
| 5.046 | 38 |
| 4.892 | 43 |
| 4.809 | 28 |
| 4.720 | 39 |

TABLE I—Continued

| d (A.): | $I_0$ |
|---|---|
| 4.630 | 70 |
| 4.390 | 20 |
| 4.246 | 25 |
| 4.190 | 48 |
| 4.050 | 21 |
| 3.963 | 61 |
| 3.756 | 49 |
| 3.677 | 38 |
| 3.562 | 36 |
| 3.463 | 34 |
| 3.357 | 28 |
| 3.278 | 16 |
| 3.245 | 16 |
| 3.139 | 18 |
| 3.084 | 16 |
| 3.035 | 7 |
| 3.004 | 7 |

A colorless 0.5% benzene solution of this biimidazole turned purple immediately on exposure to sunlight and the color faded within a minute after shutting out the light. A control solution of the art dimer of 2,4,5-triphenylimidazolyl radical required 15 minutes to fade after the light exposure. In another measurement for color life, the benzene solution was irradiated in a quartz cell 1 cm. thick for 1 minute supported 3½ inches from a 275-watt sun lamp (General Electric RS) and placed in a spectrophotometer for a recording of the change with time in the optical density (D) of the maximum absorption band at 545 m$\mu$. A reading was also obtained after the solution had been kept in the dark overnight and used as an "infinity" reading ($D_\infty$). A plot of $1/(D-D_\infty)$ vs. time (minutes) gave a line whose slope represented the color fading rate of the phototrope and provided a reproducible quantitative value of this property for comparison with a control compound not having an ortho-substituent in the 2-phenyl ring and other phototropes. The value obtained for the 2-(o-chlorophenyl)-4,5-diphenylimidazolyl radical of this example, i.e., the slope of the above graph, was 7.3 compared with 0.46 for the art unsubstituted triphenylimidazolyl radical, that is, the radical from the new compound fades about 16 times as fast as the radical from the unsubstituted compound.

EXAMPLE II

By the procedure of Example I, 1.75 parts of 2,4-dichlorobenzaldehyde (0.01 mole) was reacted with benzil to produce 3.5 parts of 2-(2,5-dichlorophenyl)-4,5-diphenylimidazole, a white, crystalline solid having a melting point of 174.5–175°C. and the following analysis:

Calculated (percent): C=69.0; H=3.9; N=7.7. Found (percent): C=69.0; H=4.0; N=7.4.

1.2 parts of the imidazole was oxidized to 2,2'-bis(2,4'-dichlorophenyl)-4,5',5,5'-tetraphenyl-1,2'-biimidazole by treatment with potassium ferricyanide as described in Example I. The product was obtained in 81% yield as a pale yellow phototropic solid. It softens at 90° C., forms a gel at 115° C., becomes a yellow liquid at 133° C., turns red at 210° C., becomes orange at 250° C., and decomposes at 262° C. Analysis for the unsolvated biimidazole was:

Calculated (percent): S=69.2; H=3.6; N=7.7. Found (percent): C=69.3; H=4.2; N=7.4.

A 0.5% benzene solution of the above product turned purple on exposure to sunlight, the color fading in 45 seconds. From optical density measurements of the 558 m$\mu$ absorption band obtained as described in Example I, the color fading rate value was 17, indicating a fading rate of about 35 times that of the art 2,4,5-triphenylimidazolyl radical with a value of 0.46 taken as a control.

The solid material turns purple on exposure to light and reverts to the original pale yellow color when taken from the light.

EXAMPLE III o-Anisaldehyde in an amount of 1.4 parts was reacted with 2.1 parts of benzil as described in Example I to produce 2.9 parts (90% yield) of 2-o-anisyl-4,5-diphenylimidazole. This imidazole is a white, crystalline solid having a melting point of 207.5–208.5° C. and the following analysis:

Calculated (percent): C=81.0; H=5.6; N=8.6. Found (percent): C=80.8; H=5.6; N=8.5

When 1.1 parts of the imidazole was oxidized with potassium ferricyanide according to the procedure of Example I, 0.96 part of a pale green phototropic 2,2'-di(o-anisyl)-4,4',5,5'-tetraphenyl-1,2'-biimidazole was produced. On heating, this material softens at 160° C., remaining pale green. On continued heating it darkens to brown and turns red when the temperature reaches 210° C. On exposure to light at room temperature the biimidazole turns a weak blue. Identity of the product was confirmed by the following analysis for a material solvated on the average with 2 moles of ethanol for every 3 moles of biimidazole:

Calculated (percent): C=80.0; H=5.6; N=8.2. Found percent): C=79.8; H=5.4; N=8.6.

A 0.5% benzene solution turned weak blue when irradiated with sunlight. The color fading rate value by optical density measurement of the maximum absorption band at 612 m$\mu$ obtained as described in Example I was 7.7 vs. 0.46 for the art unsubstituted triphenylimidazolyl radical, indicative of a fadeout in less than a minute.

EXAMPLE IV 2,4-dimethoxybenzaldehyde (1.7 parts) was reacted with benzil as in Example I to give 3.2 parts as a 90% yield of 2-(2,4-dimethoxyphenyl)-4,5-diphenylimidazole. This compound is a white solid melting at 164–165° C. and show the following analysis:

Calculated (percent): C=77.5; H=5.7; N=7.9. Found (percent): C=77.9; H=5.8; N=8.0.

Upon oxidation with potassium ferricyanide the imidazole was converted in 91% yield to 2,2'-bis(2,4-dimethoxyphenyl)-4,4',5,5'-tetraphenyl-1,2'-biimidazole, a pale green phototropic solid. Analysis of a portion of the product which was isolated in an unsolvated state was:

Calculated (percent): C=77.7; H=5.4; N=7.9. Found (percent): C=77.2; H=5.8; N=7.8.

The solid turned blue-green when exposed to light and reverted to a pale green when removed from the light. A benzene solution also turned blue-green on light exposure and exhibited a color fading rating value of 0.82 by measurement of the change of the optical density of the 611 m$\mu$ absorption band in the spectrophotometer within a time range as described in Example I. Such a value indicates a color fading rate essentially two times that of the unsubstituted triphenylimidazolyl radical.

EXAMPLE V 1-naphthaldehyde (1.6 parts) was condensed with benzil in the presence of ammonium acetate as described in Example I to produce in 99% yield 2-(-naphthyl)-4,5-diphenylimidazole as a white crystalline solid having a melting point of 289.5–290° C. and an analysis:

Calculated (percent): C=86.7; H=5.2; N=8.1. Found (percent): C=87.0; H=5.2; N=8.2.

By treatment with potassium ferricyanide the imidazole was oxidized to 2,2'-di(1-naphthyl)-4,4',5,5'-tetraphenyl-1,2'-biimidazole, a pale green solid phototrope having in the unsolvated state the following analysis:

Calculated (percent): C=86.9; H=5.0; N=8.1. Found (percent): C=86.6; H=5.2; N=8.1.

With heating this biimidazole exhibits at 85° C. a brightening of the green color. At 130° C. the color fades to a yellow. The compound softens at 153° C. and forms a yellow gel at 165° C. On cooling the material to room temperature and reheating these changes may be repeated.

The solid material turns orange on exposure to sunlight and reverts to a pale yellow-orange when withdrawn from the light. A dilute colorless benzene solution turns green when radiated and gives a color fading rating value of 1.2 when the change in the optical density of the 467 mμ band is measured as described in Example I. Such a value indicates a color fading rate which is over 2.5 times that of the unsubstituted triphenylimidazolyl radical with a value of 0.46.

EXAMPLE VI

When 1.9 parts of o-bromobenzaldehyde was used in place of the o-chlorobenzaldehyde in Example I, 3.6 parts (97% yield) of 2-(o-bromophenyl)-4,5-diphenylimidazole was produced. This produce is a white crystalline solid melting at 205.5°–206.5° C. and having the following analysis:

Calculated (percent): C=67.2; H=4.0, N=7.5. Found (percent): C=67.8; H=4.4; N=7.4.

1.3 parts of the imidazole was oxidized with potassium ferricyanide as described in Example I, the compound being converted to 2,2' - bis(o - bromophenyl)-4,4'-5,5'-tetraphenyl-1,2'-biimidazole, in 90% yield. This dimer is a pale yellow solid which softens at 106° C. and forms a yellow gel at 120° C. Its identity was confirmed by the following analysis of the material isolated as a product solvated on the average with 2 moles of ethanol for every 3 moles of biimidazole:

Calculated (percent): C=66.8; H=4.1; N=7.2. Found (percent): C=68.8; H=4.0; N=7.2.

The biimidazole, after recrystallization from methanol, has the following crystallographic characterization:

Monoclinic elementary cell with $a$=13.215 A., $b$=20.143 A., $c$=15.996 A., $\beta$=122.0°.
Space group $P2_1/c$.
An X-ray density of 1.376 g./cm.$^3$ is calculated for 4 dimer molecules per elementary cell.

X-ray powder diffraction data is set forth in the following Table II.

TABLE II

Interplanar spacings $d$ (A.) and estimated intensities ($I_o$) of the powder diffraction pattern of $C_{42}H_{28}N_4Br_2$ after recrystallization from methanol

| $d$ (A.) | $I_o$ |
|---|---|
| 11.19 | 15 |
| 10.56 | 7 |
| 10.12 | 100 |
| 9.840 | 51 |
| 8.041 | 5 |
| 7.818 | 12 |
| 7.334 | 23 |
| 6.189 | 11 |
| 5.923 | 23 |
| 5.758 | 16 |
| 5.615 | 16 |
| 4.782 | 11 |
| 4.651 | 33 |
| 4.619 | 28 |
| 4.393 | 18 |
| 4.300 | 18 |
| 4.266 | 17 |
| 4.106 | 16 |
| 4.035 | 48 |
| 3.911 | 22 |
| 3.863 | 17 |
| 3.793 | 20 |
| 3.750 | 32 |
| 3.682 | 5 |
| 3.568 | 8 |
| 3.509 | 17 |
| 3.465 | 9 |
| 3.384 | 33 |
| 3.373 | 30 |
| 3.320 | 9 |

TABLE II—Continued

| $d$ (A.) | $I_o$ |
|---|---|
| 3.268 | 7 |
| 3.226 | 14 |
| 3.190 | 41 |
| 3.081 | 20 |
| 3.006 | 27 |
| 2.968 | 9 |
| 2.816 | 34 |
| 2.666 | 7 |
| 2.615 | 13 |
| 2.591 | 5 |
| 2.576 | 4 |
| 2.523 | 8 |
| 2.502 | 5 |
| 2.489 | 6 |
| 2.428 | 5 |
| 2.358 | 5 |
| 2.324 | 12 |
| 2.309 | 8 |
| 2.200 | 5 |
| 2.189 | 8 |

Irradiation of the solid biimidazole under a sun lamp gave a purple coloration. A purple solution formed at once when an essentially colorless 0.5% benzene solution of the phototrope was similarly irradiated, and the color faded in about a minute when the light was turned off. A measurement, as described in Example I, of the rate of color fading by recording the change in the optical density of the 550 mμ absorption band following the irradiation gave a value of 7.4, which is about 16 times the fading rate of the unsubstituted triphenylimidazolyl radical.

The above dimer of 2-(o-bromophenyl)-4,5-diphenylimidazolyl radical recrystallized from methanol is linked in the 1,2' positions and the compound is, therefore, 2,2'-bis(o-bromophenyl) - 4,4',5,5' - tetraphenyl - 1,2' - biimidazole. The molecular configuration was determined by X-ray crystal structure analysis. The measured atomic coordinates are given in Table III, the bond lengths in angstrom units and bond angles are listed in Table IV and dihedral angles between various planes of the dimer molecule are stated in Table V.

The individual atoms of the biimidazole referred to in the tables are identified for a biimidazole having a 2–3' linkage as shown in Formula III which follows since this structure and corresponding nomenclature were used in treating the crystallographic data set forth. It will be recognized, however, that this 2–3' linkage is identical with the 1,2'-linkage which has been used throughout the present specification to name the biimidazoles having this structure.

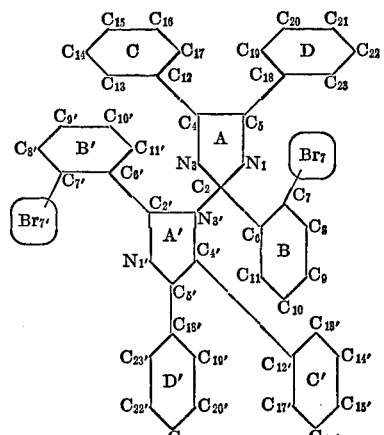

FORMULA III

This dimer was chosen for structure analysis because it has a relatively small elementary cell with four molecules. The data in Tables III, IV, and V were obtained as follows:

After recrystallization from methanol the dimer of 2-(o-bromophenyl)-4,5-diphenylimidazole retains varying amounts of solvent. Heating to 100° C. and high vacuum are required to remove totally the occluded methanol. However, since powder diffraction diagrams of this dimer before and after removal of the solvent are identical, the methanol forms no stoichiometric solvate. Electron density diagrams computed during the subsequent structure analysis show no additional peaks indicative of the presence of methanol in crystallographic positions. Therefore, it follows that methanol occupies random positions between the dimer molecules.

A single crystal was mounted on top of a glass fiber on a goniometer and three-dimensional X-ray data were recorded on film using the equi-inclination Weissenberg technique. CuKα radiation was used throughout. Three exposures of 9.6, 96, and 960 minutes were made for each layer along the <010> axis from the equator $(h0l)$ to the twelfth layer $(h:12:l)$. Subsequent exposures three weeks later showed that the crystal was stable in air and ordinary light and no special protection of the crystal was required.

The X-ray intensities were estimated visually by use of calibration strips. Out of a total of 5346 theoretical reflections, 3573 reflections with $2\theta$ angles less than 157° were measured; 1773 reflections could not be observed because their intensity was too small.

An IBM 7040 computer was used for applying the Lorentz-polarization correction to the observed intensities, as well as for all other crystallographic computations. No absorption correction was made.

A sharpened three-dimensional Patterson synthesis was prepared for the dimer. Since this compound contains 4 molecules with 8 bromine atoms per elementary cell in space group $P2_1/c$, there is a total of 64 symmetry-related Br-Br vectors. All Br-Br vectors were identified by the following atomic coordinates:

$$Br(7) x=0.3503\ y=0.25\ z=0.236_0$$
$$Br(7') x=0.035_1\ y=0.25\ z=0.274_6$$

The positions of the carbon and nitrogen atoms which form the organic molecule were not derived from these vector diagrams. Instead, the positions of the bromine atoms were used for two independent mathematical operations which produce electron density diagrams: Fourier synthesis and minimum functions. A Fourier synthesis calculated with about 90% correct signs was obtained by using only Br atoms. This showed the approximate atomic positions in the electron density diagrams as well as spurious peaks.

Minimum functions $M_2Br(7)$ and $M_2Br(7')$ were based upon superpositions of the two independent Br atoms and were combined to an $M_4Br$ (7,7') minimum function. Although the superposition function is a mathematical operation different from the Fourier synthesis, the resulting electron density diagram showed the same adventitious pseudo-mirror planes which cause the doubling of all peaks.

The subsequent location of carbon and nitrogen positions was determined by combining the electron-density diagrams obtained from the Fourier-synthesis and the minimum function $M_4$. Since only peaks coinciding on both three-dimensional diagrams represent true atomic positions, all noncoincident peaks were omitted. Each peak was fitted into either a hexagon or a pentagon. In this way it was possible to locate, on both electron-density diagrams, three coinciding hexagons and one pentagon, in addition to the two bromine atoms.

A new cycle of structure factor calculations based on one half of the organic molecule which had been located together with the two bromine atoms was followed by another three-dimensional Fourier-synthesis. One more hexagon and one pentagon were located from this diagram and two more structure-factor calculations and subsequent Fourier-syntheses were required to locate the positions of all carbon and nitrogen atoms in the dimer molecule.

Refinement of the atomic positions in the dimer molecule as located in electron density diagrams was made by least-squares analysis. All structural parameters, isotropic thermal parameters, and scale factors were varied to bring the difference between observed and calculated structure factors compared with the sum of the observed structure factors to a minimum according to:

$$R = \frac{\Sigma ||F_o| - |F_c||}{\Sigma |F_o|}$$

The refinement was terminated after several cycles of structure factor calculations and least-square analysis when the parameter changes became insignificant and the final R-value was 0.109.

This value is well below the internationally accepted standard of 0.15 for this reliability index.

TABLE III

Atomic coordinates, standard deviations and temperature factors of 2,2-bis(o-bromophenyl)-4,4',5,5'-tetraphenyl-1,2'-biimidazole ($C_{42}H_{28}N_4Br_2$) follow:

| | X | Y | Z | σ(ax) | σ(by) | σ(cz) | B |
|---|---|---|---|---|---|---|---|
| Br(7)[1] | 0.3484 | 0.2369 | 0.7377 | 0.002 | 0.002 | 0.002 | 5.463 |
| N(1) | 0.1189 | 0.1660 | 0.5344 | 0.010 | 0.010 | 0.010 | 2.886 |
| C(2) | 0.2254 | 0.1497 | 0.5306 | 0.012 | 0.013 | 0.012 | 2.986 |
| N(3) | 0.1893 | 0.1054 | 0.4456 | 0.010 | 0.010 | 0.010 | 3.128 |
| C(4) | 0.0805 | 0.0934 | 0.4097 | 0.013 | 0.013 | 0.012 | 3.118 |
| C(5) | 0.0317 | 0.1306 | 0.4634 | 0.012 | 0.012 | 0.012 | 2.813 |
| C(6) | 0.3143 | 0.1154 | 0.6266 | 0.013 | 0.014 | 0.013 | 3.250 |
| C(7) | 0.3706 | 0.1443 | 0.7179 | 0.012 | 0.012 | 0.012 | 2.794 |
| C(8) | 0.4542 | 0.1130 | 0.8067 | 0.014 | 0.015 | 0.014 | 4.016 |
| C(9) | 0.4740 | 0.0463 | 0.8007 | 0.018 | 0.018 | 0.018 | 5.593 |
| C(10) | 0.4197 | 0.0133 | 0.7116 | 0.017 | 0.016 | 0.017 | 5.202 |
| C(11) | 0.3398 | 0.0484 | 0.6245 | 0.016 | 0.016 | 0.016 | 4.937 |
| C(12) | 0.0141 | 0.0421 | 0.3308 | 0.014 | 0.014 | 0.014 | 3.750 |
| C(13) | 0.0451 | 0.0329 | 0.2620 | 0.015 | 0.014 | 0.015 | 4.262 |
| C(14) | 0.0163 | 0.4799 | 0.3088 | 0.019 | 0.018 | 0.019 | 6.272 |
| C(15) | 0.0985 | 0.4455 | 0.3076 | 0.021 | 0.019 | 0.021 | 7.317 |
| C(16) | 1.1341 | 0.4539 | 0.2414 | 0.017 | 0.016 | 0.017 | 5.515 |
| C(17) | 0.9240 | 0.0059 | 0.3315 | 0.016 | 0.016 | 0.016 | 4.927 |
| C(18) | 0.9139 | 0.1398 | 0.4437 | 0.012 | 0.012 | 0.012 | 2.835 |
| C(19) | 0.8171 | 0.1444 | 0.3440 | 0.014 | 0.014 | 0.014 | 3.855 |
| C(20) | 0.7042 | 0.1605 | 0.3271 | 0.015 | 0.014 | 0.015 | 4.273 |
| C(21) | 0.6820 | 0.1747 | 0.4003 | 0.016 | 0.015 | 0.016 | 4.660 |
| C(22) | 0.7804 | 0.1693 | 0.4997 | 0.016 | 0.015 | 0.016 | 4.950 |
| C(23) | 0.8935 | 0.1502 | 0.5189 | 0.015 | 0.014 | 0.015 | 4.191 |
| Br(7') | 0.0346 | 0.2491 | 0.2740 | 0.002 | 0.002 | 0.002 | 6.323 |
| N(1') | 0.3011 | 0.3183 | 0.5056 | 0.010 | 0.010 | 0.010 | 2.966 |
| C(2') | 0.2256 | 0.2767 | 0.4974 | 0.013 | 0.014 | 0.013 | 3.306 |
| N(3') | 0.2745 | 0.2127 | 0.5167 | 0.010 | 0.010 | 0.010 | 2.938 |
| C(4') | 0.3877 | 0.2190 | 0.5354 | 0.012 | 0.013 | 0.012 | 2.855 |
| C(5') | 0.4016 | 0.2889 | 0.5289 | 0.012 | 0.013 | 0.012 | 2.848 |
| C(6') | 0.0990 | 0.2925 | 0.4672 | 0.014 | 0.014 | 0.014 | 3.978 |
| C(7') | 0.0075 | 0.2857 | 0.3715 | 0.015 | 0.015 | 0.015 | 4.422 |
| C(8') | 0.8881 | 0.3035 | 0.3417 | 0.017 | 0.016 | 0.017 | 5.421 |
| C(9') | 0.8713 | 0.3295 | 0.4080 | 0.018 | 0.107 | 0.018 | 5.774 |
| C(10') | 0.9608 | 0.3385 | 0.5033 | 0.018 | 0.016 | 0.018 | 5.491 |
| C(11') | 0.0808 | 0.3191 | 0.5379 | 0.016 | 0.015 | 0.016 | 4.843 |
| C(12') | 0.4728 | 0.1637 | 0.5541 | 0.012 | 0.013 | 0.012 | 2.878 |
| C(13') | 0.5653 | 0.1523 | 0.6480 | 0.014 | 0.014 | 0.014 | 3.813 |
| C(14') | 0.6470 | 0.1014 | 0.6572 | 0.017 | 0.017 | 0.017 | 5.538 |
| C(15') | 0.6294 | 0.0629 | 0.5790 | 0.018 | 0.017 | 0.018 | 5.651 |
| C(16') | 0.5320 | 0.0771 | 0.4849 | 0.015 | 0.017 | 0.019 | 6.110 |
| C(17') | 0.4513 | 0.1262 | 0.4723 | 0.015 | 0.015 | 0.015 | 4.537 |
| C(18') | 0.5070 | 0.3203 | 0.5439 | 0.013 | 0.014 | 0.013 | 3.278 |
| C(19') | 0.5107 | 0.3931 | 0.5600 | 0.015 | 0.015 | 0.015 | 4.333 |
| C(20') | 0.6140 | 0.4257 | 0.5741 | 0.018 | 0.017 | 0.018 | 5.583 |
| C(21') | 0.7100 | 0.3982 | 0.5770 | 0.015 | 0.015 | 0.015 | 4.328 |
| C(22') | 0.7027 | 0.3268 | 0.5630 | 0.015 | 0.016 | 0.015 | 4.546 |
| C(23') | 0.6046 | 0.2932 | 0.5467 | 0.014 | 0.014 | 0.014 | 3.948 |

[1] The specific atoms are identified in Formula III.

TABLE IV

Bond lengths and bond angles in 2,2'-bis(o-bromophenyl)-4,4',5,5'-tetraphenyl-1,2'-biimidazole

A.

$N(1)^1-C(2)^1$ _____ 1.477
$C(2)-N(3)$ _____ 1.480
$N(3)-C(4)$ _____ 1.258
$C(4)-C(5)$ _____ 1.518
$C(5)-N(1)$ _____ 1.319
$C(2)-C(6)$ _____ 1.517
$C(6)-C(7)$ _____ 1.369
$C(7)-Br(7)$ _____ 1.940
$C(7)-C(8)$ _____ 1.405
$C(8)-C(9)$ _____ 1.381
$C(9)-C(10)$ _____ 1.380
$C(10)-C(11)$ _____ 1.412

See footnotes at bottom of table.

TABLE IV—Continued

| Bond | A. |
|---|---|
| C(11)–C(6) | 1.397 |
| C(4)–C(12) | 1.501 |
| C(12)–C(13) | 1.376 |
| C(13)–C(14) | 1.451 |
| C(14)–C(15) | 1.298 |
| C(15)–C(16) | 1.399 |
| C(16)–C(17) | 1.448 |
| C(17)–C(12) | 1.401 |
| C(5)–C(18) | 1.556 |
| C(18)–C(19) | 1.388 |
| C(19)–C(20) | 1.406 |
| C(20)–C(21) | 1.378 |
| C(21)–C(22) | 1.429 |
| C(22)–C(23) | 1.412 |
| C(23)–C(18) | 1.297 |
| C(2)–N(3') | 1.495 |
| N(1')–C(2') | 1.255 |
| C(2')–N(3') | 1.401 |
| N(3')–C(4') | 1.367 |
| C(4')–C(5') | 1.430 |
| C(5')–N(1') | 1.316 |
| C(2')–C(6') | 1.508 |
| C(6')–C(7') | 1.364 |
| C(7')–Br(7') | 1.923 |
| C(7')–C(8') | 1.431 |
| C(8')–C(9') | 1.303 |
| C(9')–C(10') | 1.358 |
| C(10')–C(11') | 1.430 |
| C(11')–C(6') | 1.383 |
| C(4')–C(12') | 1.498 |
| C(12')–C(13') | 1.363 |
| C(13')–C(14') | 1.441 |
| C(14')–C(15') | 1.382 |
| C(15')–C(16') | 1.397 |
| C(16')–C(17') | 1.389 |
| C(17')–C(12') | 1.403 |
| C(5')–C(18') | 1.429 |
| C(18')–C(19') | 1.487 |
| C(19')–C(20') | 1.421 |
| C(20')–C(21') | 1.363 |
| C(21')–C(22') | 1.451 |
| C(22')–C(23') | 1.359 |
| C(23')–(C18') | 1.380 |

| Angle | Degrees |
|---|---|
| N(1)–C(2)–N(3) | 108.8 |
| C(2)–N(3)–C(4) | 105.6 |
| N(3)–C(4)–C(5) | 111.9 |
| C(4)–C(5)–N(1) | 108.4 |
| C(6)–C(7)–C(8) | 125.4 |
| C(7)–C(8)–C(9) | 116.3 |
| C(8)–C(9)–C(10) | 121.7 |
| C(9)–C(10)–C(11) | 119.1 |
| C(10)–C(11)–C(6) | 121.6 |
| C(11)–C(6)–C(7) | 115.7 |
| C(12)–C(13)–C(14) | 116.3 |
| C(13)–C(14)–C(15) | 120.6 |
| C(14)–C(15)–C(16) | 125.0 |
| C(15)–C(16)–C(17) | 117.2 |
| C(16)–C(17)–C(12) | 117.4 |
| C(17)–C(12)–C(13) | 123.4 |
| C(18)–C(19)–C(20) | 112.5 |
| C(19)–C(20)–C(21) | 124.5 |
| C(20)–C(21)–C(22) | 116.9 |
| C(21)–C(22)–C(23) | 119.7 |
| C(22)–C(23)–C(18) | 117.6 |
| C(23)–C(18)–C(19) | 128.7 |
| N(1)–C(2)–C(6) | 107.7 |
| N(3)–C(2)–C(6) | 110.8 |
| C(2)–C(6)–C(7) | 125.3 |
| C(2)–C(6)–C(11) | 118.9 |
| N(3)–C(4)–C(12) | 122.2 |
| C(5)–C(4)–C(12) | 125.5 |
| C(4)–C(12)–C(13) | 118.5 |
| C(4)–C(12)–C(17) | 118.2 |
| N(1)–C(5)–C(18) | 118.0 |
| C(4)–C(5)–C(18) | 133.3 |
| C(5)–C(18)–C(19) | 112.9 |
| C(5)–C(18)–C(23) | 117.9 |
| C(6)–C(7)–Br(7) | 122.6 |
| C(8)–C(7)–Br(7) | 111.9 |
| N(3')–C(2)–C(6) | 111.9 |
| N(1)–C(2)–N(3') | 108.4 |
| N(3)–C(2)–N(3') | 109.3 |
| C(2')–N(3')–C(2) | 128.9 |
| C(4')–N(3')–C(2) | 123.8 |
| N(1')–C(2')–N(3') | 110.0 |
| C(2')–N(3')–C(4') | 106.6 |
| N(3')–C(4')–C(5') | 104.1 |
| C(4')–C(5')–N(1') | 110.9 |
| C(6')–C(7')–C(8') | 121.0 |
| C(7')–C(8')–C(9') | 117.6 |
| C(8')–C(9')–C(10') | 123.0 |
| C(9')–C(10')–C(11') | 121.7 |
| C(10')–C(11')–C(6') | 115.3 |
| C(11')–C(6')–C(7') | 121.4 |
| C(12')–C(13')–C(14') | 114.7 |
| C(13')–C(14')–C(15') | 123.7 |
| C(14')–C(15')–C(16') | 118.5 |
| C(15')–C(16')–C(17') | 120.1 |
| C(16')–C(17')–C(12') | 119.2 |
| C(17')–C(12')–C(13') | 123.9 |
| C(18')–C(19')–C(20') | 115.1 |
| C(19')–C(20')–C(21') | 128.0 |
| C(20')–C(21')–C(22') | 114.4 |
| C(21')–C(22')–C(23') | 120.2 |
| C(22')–C(23')–C(18') | 126.1 |
| C(23')–C(18')–C(19') | 116.1 |
| N(1')–C(2')–C(6') | 125.4 |
| N(3')–C(2')–C(6') | 124.6 |
| C(2')–C(6')–C(7') | 120.8 |
| C(2')–C(6')–C(11') | 117.6 |
| N(3')–C(4')–C(12') | 126.4 |
| C(5')–C(4')–C(12') | 129.4 |
| C(4')–C(12')–C(13') | 119.0 |
| C(4')–C(12')–C(17') | 117.1 |
| N(1')–C(5')–C(18') | 126.6 |
| C(4')–C(5')–C(18') | 125.1 |
| C(5')–C(18')–C(19') | 114.0 |
| C(5')–C(18')–C(23') | 129.9 |
| C(6')–C(7')–Br(7') | 120.8 |
| C(8')–C(7')–Br(7') | 118.2 |

[1] The specific atoms are identified in Formula III.

TABLE V

The dihedral angles between intramolecular imidazolyl and phenyl group planes in 2,2'-bis(o-bromophenyl)-4,4', 5,5'-tetraphenyl-1,2'-biimidazole follow.

| Planes: | Angle, degrees |
|---|---|
| A–A' | 121 |
| A–B | 67 |
| A–C | 33 |
| A–D | 38 |
| A'–B' | 101 |
| A'–C' | 103 |
| A'–D' | 164 |

EXAMPLE VII 2-(o-fluorophenyl)-4,5-diphenylimidazole was made in 99% yield by reacting 1.2 parts of o-fluorobenzaldehyde with benzil as described in Example I. The product is a white crystalline solid melting at 205.5–206° C. It gave the following analysis:

Calculated (percent): C=80.2; H=4.8; N=8.9. Found (percent): C=80.0; H=4.9; N=8.9.

When 1.0 part of the imidazole was reacted with potassium ferricyanide in an ethanol solution of potassium hydroxide as was done in Example I, 2,2'-bis(o-fluorophenyl)-4,4',5,5'-tetraphenyl-1,2'-biimidazole was produced in a 78% yield. This biimidazole is a pale yellow solid which softens at 139°–149° C., forms a gel at 158° C., and changes to a yellow-brown liquid at 165° C. Recrystallization from ethyl ether gives unsolvated dimer, M.P. 216.5–217° C.

The phototropic biimidazole containing one mole of water per mole of compound analyzed as follows:
Calculated (percent): C=78.3; H=4.7; N=8.7. Found (percent): C=78.6; H=4.8; N=8.6.

Upon irradiation by direct or indirect (through window glass) sunlight or by a sun lamp the pale yellow compound in the solid state turns purple, and the color fades when the radiation is stopped. An essentially colorless benzene solution of 0.5% concentration is also colored purple when it is exposed to this radiation and soon reverts to the colorless condition when the solution is removed from the light or the light is shut off. A quantitative measurement, as described in Example I, of the rate of color fading by recording the change in optical density of the maximum absorption band for the colored solution at 548 m$\mu$ gives a rate value of 6.2 which shows the imidazolyl radical having a fluorine substituent in an ortho position of the 2-phenyl group to have a color life about $\frac{1}{13}$ that of the unsubstituted compound, the latter having a fading rating of 0.46.

By using the procedure described in Example I above with the appropriate substituted benzaldehyde or 9-phenanthrene carboxaldehyde, the following substituted biimidazoles were prepared:

2,2' - bis(o - ethoxyphenyl) - 4,4',5,5' - tetraphenyl-1,2'-biimidazole.—This compound is a light yellow solid which softens at 138° C., and becomes a green gel at 140° to 145° C. and a clear green liquid at 154° C. A further effect is observed when the green liquid turns brown between 165 and 180° C. and orange at 218° C. On light exposure at room temperature a benzene solution of the compound turns blue, and the color decays in about 5 minutes in the dark. The identity of the compound was confirmed by the following analysis of unsolvated material:
Calculated (percent): C=81.4; H=5.64; N=8.25. Found (percent): C=80.8; H=5.65; N=8.15.

2,2' - bis(2,3 - dimethoxyphenyl) - 4,4',5,5' - tetraphenyl-1,2'-biimidazole.—This is a light yellow solid which softens at 95° C. and becomes a yellow gel at 104° C., a yellow liquid at 140° C., orange at 160° C., red-orange at 180° C., and brown at 200° C. An irradiated benzene solution of the compound turns purple and loses its color in the dark in about 6 minutes. A chemical analysis was as follows:
Calculated for the material solvated on the average with one mole of ethanol for every two moles of compound (percent): C=77.0; H=5.63; N=7.64. Found (percent): C=76.95; H=5.70; N=7.68.

2,2' - bis(9 - phenanthryl) - 4,4',5,5' - tetraphenyl - 1,2'-biimidazole.—This biimidazole is a pale pink solid which turns yellow and softens at 165° C. and becomes a yellow gel at 180° C. and a yellow liquid at 230° C. In a benzene solution the compound turns yellow-orange when irradiated and loses the color in the dark in less than two minutes. An analysis of the material solvated on the average with one mole of ethanol for every two moles of compound:
Calculated (percent): C=87.2; H=4.91; N=7.00. Found (percent): C=87.2; H=4.6; N=7.00.

2,2' - bis(o - chlorophenyl) - 4,4',5,5' - tetrakis(m-methoxyphenyl)-1,2'-biimidazole.—This compound is a light yellow solid with a melting point of 175–178.5° C. and having the following characteristics:
Analysis.—Calc'd for $C_{46}H_{36}N_4O_4Cl_2$ (percent): C, 70.87; H, 4.65; N, 7.18; Cl, 9.09. Found (percent): C, 70.84; H, 4.66; N, 7.25; Cl, 8.97.
M.W.: Calc'd 780. Found 806.
$\lambda_{max}$: 260 m$\mu$, $\epsilon$=28,000.

Additional dimer compounds prepared by the procedure of Example I include 2,2'-bis(o-methylphenyl)-4,4',5,5'-tetraphenyl-1,2'-biimidazole, M.P. 120° C., giving a violet radical with a 3.5 color fading value as measured in benzene by the procedure described in Example 1; 2,2'-bis-(2,4,6 - trimethylphenyl) - 4,4',5,5' - tetraphenyl-1,2'-biimidazole giving a violet color, having a color life of about 7 minutes and a fading rate of 1.0; 2,2'-bis(o-methoxyphenyl) - 4,4' - bis(p - methoxyphenyl) - 5,5' - diphenyl-1,2'-biimidazole giving a blue color having a color life of about 4 minutes and fading rate of 1.61; 2,2'-di(1-naphthyl) - 4,4',5,5' - tetrakis(p - methoxyphenyl) - 1,2'-biimidazole giving a green color, having a color life of about 7 minutes and a fading rate of 1.01 as measured at 660 m$\mu$; and 2,2' - bis(o-methoxyphenyl)-4,4',5,5'-tetrakis(p-methoxyphenyl)-1,2'-biimidazole which gives a blue color and has a fading rate of 0.50.

Additional substituted dimers of 2,4,5-triphenylimidazolyl radicals of this invention, prepared as described in Example I, are set forth in he following Table VI wherein the substituents are present on the phenyl groups as designated in the formula. It is understood that upon irradiation, the corresponding imidazolyl forms:

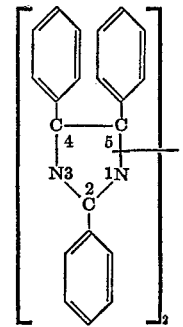

It is understood that in the above formula conjugated double bonds exist in the heterocyclic rings in accordance with the positions of the linkage between these rings.

TABLE VI

Substituents of phenyl rings attached to imidazolyl radical at—

| 2-position | 4-position | 5-position |
|---|---|---|
| o-Acetoxy | | |
| o-Benzyl | | |
| 2,3-benzo(1-naphthyl) | | |
| 2,3-benzo | 2,3-benzo | |
| Do | do | 2,3-benzo. |
| Do | p-Methoxy | p-Methoxy. |
| 3,4-benzo-2-methoxy-(2-(1-methoxy)naphthyl). | | |
| 4,5-benzo-2-methoxy-(2-(3-methoxy)naphthyl). | | |
| o-Benzylthio | o-Benzylthio | o-Benzylthio. |
| o-Bromo | | |
| Do | p-Bromo | |
| Do | o-Methoxy | o-Methoxy. |
| 2-bromo-4-phenyl | | |
| o-Butoxy | | |
| o-N-butyl | | |
| N-butylacetamido | | |
| o-Butylthio | | |
| o-Butyryloxy | | |
| o-Chloro | | |
| Do | o-Chloro | |
| Do | p-Chloro | |
| Do | o-Chloro | o-Chloro. |
| Do | 3,4-dichloro | |
| Do | m-Pentyloxy | |
| Do | p-Methoxy | p-Methoxy. |
| Do | o-Methoxy | o-Methoxy. |
| Do | m-Methyl | m-Methyl. |
| Do | m-Methoxy | m-Methoxy. |
| Do | m-Ethoxy | m-Ethoxy. |
| Do | m-($\beta$-Phenoxyethoxy) | m-($\beta$-Phenoxyethoxy). |
| Do | p-Propionyloxy | |
| 2-chloro-4-phenyl | | |

TABLE VI—Continued

Substituents of phenyl rings attached to imidazolyl radical at—

| 2-position | 4-position | 5-position |
|---|---|---|
| o-Cyano | | |
| Do | p-t-Butyl | |
| Do | do | p-t-Butyl. |
| Do | p-Cyano | p-Cyano. |
| Do | p-Methoxy | p-Methoxy. |
| 2,3,4,5-dibenzo(9-phenanthryl) | | |
| 2,3-dibromo | | |
| 2,4-dibromo | | |
| 2,6-dibutyl | | |
| o-Dibutylsulfamoyl | | |
| 2,4-dichloro | | |
| Do | o-Bromo | |
| 2,6-dichloro | | |
| Do | p-Butoxy | p-Butoxy. |
| 2,4-dicyano | p-Cyano | p-Cyano. |
| 2,6-dicyano | | |
| 2,4-diethoxy | | |
| o-Diethylsulfamoyl | | |
| 2,5-difluoro | p-Cyano | |
| Do | do | Do. |
| 2,3-dimethoxy | | |
| 2,4-dimethoxy | | |
| Do | o-Chloro | |
| Do | do | o-Chloro. |
| Do | 2,4-dimethoxy | |
| Do | do | 2,4-dimethoxy. |
| Do | o-Methoxy | |
| Do | p-Methoxy | |
| Do | m-Phenylthio | |
| Do | do | m-Phenylthio. |
| o-Dimethylcarbamoyl | | |
| 2,4-dinaphthylthio | | |
| 2,4-dipentyl | 2,4-dipentyl | 2,4-dipentyl. |
| Do | 3,4-benzo(2-naphthyl) | 3,4-benzo. |
| 2,4-dipropoxy | | |
| Do | o-Diethylcarbamoyl | |
| o-Dipropylcarbamoyl | | |
| o-Ethoxy | | |
| o-Ethoxycarbonyl | | |
| o-Ethyl | | |
| o-N-ethylbutyramido | | |
| o-N-ethylpropylamino | | |
| o-ethylthio | | |
| o-N-ethylvaleramido | p-t-Pentyl | p-t-Pentyl. |
| o-fluoro | | |
| Do | o-Methoxy | o-Methoxy. |
| o-Methoxy | | |
| Do | p-Chloro | |
| Do | p-Methoxy | |
| Do | o-Methoxy | Do. |
| Do | p-Methoxy | p-Methoxy. |
| Do | o-Methylthio | o-Methylthio. |
| Do | p-Nitro | |
| Do | do | p-Nitro. |
| Do | p-Phenylsulfonyl | |
| Do | do | p-Phenylsulfonyl. |
| o-Methoxycarbonyl | | |
| Do | 3,4-benzo | |
| Do | p-N-ethylphenyl-sulfamoyl | |
| 2-Methoxy-4-phenyl | | |
| o-Methyl | | |
| Do | p-Benzoyloxy | p-Benzoyloxy. |
| o-N-methylacetamido | o-N-ethylbutyramido | o-N-ethylbutyramido. |
| Do | o-N-methylacetamido | |
| Do | do | o-N-methylacetamido. |
| o-N-methylpropionamido | | |
| o-Methylthio | | |
| o-1-naphthyl | p-Phenoxy | |
| o-2-naphthyl | | |
| o-Pentyloxy | | |
| o-Pentyloxycarbonyl | | |
| Do | 3,4-benzo | 3,4-benzo. |
| o-Phenoxy | | |
| Do | 3,4,5-trimethoxy | 3,4,5-trimethoxy. |
| o-Phenyl(2-biphenyl) | | |
| o-Phenyl | p-Methoxycarbonyl | p-Methoxycarbonyl. |
| Do | m-Pentyloxycarbonyl | |
| Do | do | m-Pentyloxycarbonyl. |
| Do | p-Phenyl | p-Phenyl. |
| o-Phenylthio | p-1-Naphthylthio | p-1-Naphthylthio. |
| o-Propoxy | | |
| 2,4,6-tribromo | | |
| 2,4,6-tributyl | | |
| 2,3,5-trichloro | | |
| 2,4,5-trichloro | | |
| Do | o-butylthio | |
| 2,4,6-tricyano | p-Cyano | p-Cyano. |
| 2,4,6-triethoxy | | |
| 2,4,6-trimethoxy | | |
| 2,4,6-trimethyl | | |
| 2,4,6-tripropoxy | | |

(5) Properties

The triarylimidazolyls of this invention are relatively long-lived free (paramagnetic) radicals, which can exist for long periods of time under the influence of the light stimulus required to dissociate the photochromic dimers thereof. They have finite lifetimes in the absence of such stimulus and are characterized by their color, light absorption spectra, electron spin resonance spectra utilizing known methods [Ingram, Free Radicals as Studied by Electron Spin Resonance, Academic Press (1958)] and dimerization rate.

Their color and their longevity (which reflects their inherent stability) can be attributed to the extensively delocalized character of the odd electron, demonstrable by electron spin resonance spectroscopy. Thus in analogy to the pentaphenylcyclopentadienyl radical in which the unpaired electron can be written on 20 different carbon atoms [Hine, Physical Organic Chemistry, p. 382, Mc-Graw-Hill Book Co., Inc. (1956)] the odd electron in a 2,4,5-triphenyl imidazolyl radical can exist on at least 14 positions in a delocalized charge and spin distribution. In short the radical is actually a hybrid of all the schematically possible position isomers wherein the electrons involved are delocalized. The dotted circle in Formula I in the section entitled "Summary of the Invention" is a well-known convention for simply depicting such hybrids with delocalized electrons. Specifically, the dotted circle stands for 5 electrons which satisfy the valencies of the carbon and nitrogen atoms of the imidazolyl ring, 4 of said electrons being paired in the form of two conjugated double bonds, with the fifth electron being odd (that is, unpaired) and thereby characterizing said compounds as radicals.

In contrast to the radicals, the dimers are essentially diamagnetic and are normally colorless or substantially so, owing undoubtedly to the fact that the odd electron that characterizes the radical is no longer free and delocalized but is paired and localized in the bond joining the two imidazole rings of the dimer. Structures (a) through (e) below schematically represent the structure of the imidazole rings and the points at which they can be joined. The letters B, E and D represent the substituted phenyl groups in the 2, 4 and 5 positions of the imidazolyls of this invention.

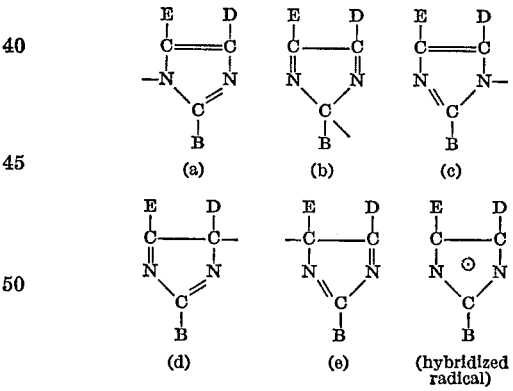

Those skilled in the art will appreciate that schematic structures (a)–(e) can also be used to illustrate canonical forms that contribute to but singly do not represent the overall resonance-hybrid structure of the free triarylimidazolyl radical. The localized structures (a) through (e) relate to the delocalized radical structure as follows: When a particular dissociable (e.g. photochromic) and substantially colorless dimer, say (a)–(a) (i.e. the 1,1'-isomer) absorbs energy (e.g. light energy) sufficient to rupture the localized bond linking the two imidazole rings, the two radicals that simultaneously form correspond initially, at the moment of bond rupture, to radicals having structure (a) wherein the free electron is still localized at the original site, i.e. the nitrogen atom at the 1-position. Such radicals are expected to have substantially the same color as the original dimer and also to be at a substantially higher energy (less stable) than the hybridized, colored radical with its delocalized electrons. But because the original bonding electron is now free to delocalize and this process inherently represents a considerable driving force towards greater radical stability (Hine, loc. cited), such radicals are expected to rearrange substantially instantaneously to the resonance-stabilized hybrid. In the same way, momentarily formed radicals (b), (c), (d) and (e) stabilize themselves by rearranging their electrons to the same hybrid state. Thus, all dimers that differ only in how the imidazole rings are joined will, upon dissociation, form an identical hybrid radical. This radical will be in equilibrium with all possible dimeric forms, as summarized by Equation 1 above where L—L stands for (a)–(a), (a)–(b), (a)–(c), (a)–(d), (a)–(e), (b)–(b), (b)–(c), (b)–(d), (b)–(e), (c)–(c), (c)–(d), (c)–(e), (d)–(d), (d)–(e) and (e)–(e); and L· is their common intermediate with its delocalized electron structure. Where the substituents at the 4 and 5 positions of the imidazole ring (designated (d) and (e) above) are the same, then positions (a) and (c) become identical, also (d) an (e), and the number of possible isomeric dimers reduces to 6.

These dimers as a class absorb in the ultraviolet. All show a maximum in the 2350 to 2850 A. region; some have a second maximum in the 3000 to 3750 A. range. Therefore to photo-dissociate the dimers into the colored triarylimidazolyl radicals, it is preferable to use light rich in such wavelengths. Photolysis can be effected by irradiating the solid dimer or preferably a solution in a suitable medium which should be substantially inert to the dimer, the imidazolyl radicals and to the photolyzing radiation. Suitable solvents include nitriles such as acetonitrile, hydrocarbons such as benzene and toluene, sulfoxides and sulfones such as diethyl sulfoxide and sulfolane, esters and polyesters such as ethyl acetate and poly (methyl methacrylate), esters and acetals such as tetrahydrofuran, polyethyleneglycol, and poly vinyl butyral, and (less preferably alcohols or other such substances having potentially abstractable hydrogens such as ethanol, 2-propanol and butanol.

Under photolyzing conditions favoring dimer dissociation, the Equation 1 equilibrium moves to the right and color appears. When the light stimulus is removed, the radicals recombine and the color fades. Normally in the absence of light the equilibrium position is so far to the left that the characteristic radical color is not evident. (Occasionally, however, the dimers themselves will show some color attributable to presence of uncombined radicals.)

The composition of the dimer or dimers in the photochromic compositions depends on such prevailing conditions as the solvent, the dimer concentration, and the temperature. For example in a sun screen containing a photochromic system of this invention, one or more dimers in equilibrium with the corresponding radicals as defined may predominate at summer or tropical temperatures, while other isomeric dimers (differing only in how the imidazole rings are joined as discussed above) may be favored at winter or arctic temperatures. The triarylimidazolyl species responsible for the phototropic system's characteristic color in activating light and its fading rate in the dark will, however, be the same under all conditions.

Of course mixtures of the photochromic dimers, which may differ not only in how the imidazole rings are joined therein but also in how the phenyl groups of the imidazole rings are substituted, can also be used in formulating photochromic systems and devices of this invention.

Since the structures of the novel triarylimidazolyl radicals, and therefore their properties such as color and recombination (color fading) rate, do not depend on how the imidazole rings are joined in the various possible corresponding dimers thereof, the dimers need only be photolytically dissociable to the corresponding triarylimidazolyl radicals for the purposes of this invention.

The biimidazoles are normally solids, and can be characterized by elemental analysis, molecular weight, melting point, color; infrared, visible, and ultraviolet adsorption spectra; phototropism, thermotropism and piezotropism (response to change in pressure) when such properties exist for a particular compound. Infrared spectroscopy, among other physical methods, may be used to determine how the imidazole rings are joined in the dimer, if this is desired, owing to differences in absorption among the carbon-carbon, carbon-nitrogen, and nitrogen-nitrogen bonds. X-ray diffraction analysis is also useful in determining biimidazole crystal form and molecular configuration. Different biimidazoles, including dimeric isomers, may differ in their phototropic and thermotropic properties, that is, in how easily they are dissociated by light and heat. Also, as discussed previously, the standard preparative procedures generally yield dimers that are thermally stable at ordinary temperatures. The biimidazoles can also be characterized by the properties of the corresponding imidazolyl radicals such as the color, absorption spectra, and recombination rate, i.e., color life, the time to revert to natural state after shutting off the source of radiation.

The triarylimidazolyl radicals of this invention, though relatively long-lived and capable of existing for long periods of time under the influence of light, combine (dimerize) at a surprisingly rapid rate, so that in the absence of the dissociating light stimulus the characteristic radical color fades rapidly at a characteristic rate, a property highly useful in sun shield applications. Such rapid color fading, attributable to the presence of an ortho-substituent in the 2-phenyl ring, is surprising since it was expected that a substitutent more bulky than hydrogen at a position so close to the imidazole ring would sterically retard rather than accelerate radical dimerization.

The ortho substitutent which characterizes all these novel compositions exerts important beneficial effects both in the biimidazoles and in the imidazolyl radicals formed therefrom on dissociation. For example such substituent raises the temperature required to thermally dissociate the dimer to the corresponding radicals. Thus in sun screens, for example, the invention dimers are more resistant to forming unwanted color due to thermal dissociation in the dark than corresponding dimers without the ortho substitutent. Moreover, in the imidazolyl radicals such ortho substituent provides for rapid color fading. Thus sun screens or glasses based on such colored radicals as light filters will, in passing from brightly to dimly lighter areas, revert rapidly to their original uncolored state. Varying the substituents in positions other than ortho in the 2-phenyl ring provides still other advantages, for example, desirable variations in color or alterations in color shade obtained on exposure to light, changes in melting point, changes in solubility in solvents, etc.

For most rapid color fading it is preferred that the 2-phenyl ring contain no more than one ortho-substituent since in general a second ortho-substituent tends to oppose the color fading enhancement effected by the first ortho-substituent. A second ortho-substituent however is quite often valuable in that it tends to further increase the thermal stability of the dimeric form.

The followng examples illustrate the effect of temperature upon the formation of a particular isomer, and illustrate the effect the ortho substituent on the 2-phenyl group has in determining the properties of the novel compositions.

EXAMPLE VIII

A toluene solution of 2,2'-bis(o-bromophenyl)-4,4',5,5'-tetraphenylbiimidazole was photolyzed at −85° C. and the relative radical concentration determined by electron spin resonance. The photolysis was stopped after the radical concentration had reached steady state, and the sample was then allowed to warm as the radical concentration was being continually monitored. The radical concentration at first increased and reached a maximum after 2 minutes. A thermocouple next to the sample tube read −20° C. The radical concentration then decreased to a minimum after 3 minutes (T=5° C.) and after passing through another maximum at 6 minutes (T=+12° C.), the concentration decayed to zero as the sample approached room temperature.

The data indicate that three different isomers of 2,2'-bis(o-bromophenyl) - 4,4',5,5'-tetraphenylbiimidazole are formed. One isomer is formed by photolysis at −85° C., a second isomer is formed between −20° and 12° C. and a third isomer is formed above 12° C. The isomer stable at room temperature is 2,2'-bis(o-bromophenyl)-4,4',5,5'-tetraphenyl-1,2'-biimidazole.

Except for slight differences in the time and temperatures, similar results are obtained with 2,2'-bis(o-chlorophenyl)-4,4',5,5'-tetraphenylbiimidazole,
2,2'-bis(o-fluorophenyl)-4,4',5,5'-tetraphenylbiimidazole,
2,2'-bis(o-methoxyphenyl)-4,4',5,5'-tetraphenylbiimidazole and
2,2'-bis(2,4-dimethoxyphenyl)-4,4',5,5'-tetraphenylbiimidazole.

The isomers thus produced may be recovered and characterized by the techniques and methods outlined above.

EXAMPLE IX

A dilute, approx. 0.7% wt., ether solution of 2,2'-bis(o-fluorophenyl - 4,4',5,5'-tetraphenyl - 1,2'-biimidazole) (prepared as in Example VII) contained in a UV-transparent glass vessel was cooled to −78° C. and irradiated with 3000–4000 A. UV light from a high intensity tensor type lamp having a rating of 200 foot candles 12 inches from the bulb and placed 12 inches from the vessel. The irradiated solution developed the purple color characteristic of the 2-orthofluorophenyl - 4,5-diphenyl imidazolyl. After 4 minutes the lamp was turned off, and a nitrogen stream passed through the solution for 4 hours at −78° C. or until substantially all the ether evaporated. During the evaporation the solution was twice more irradiated—once at ½ volume for 4 minutes, again at ¼ volume for 2 minutes. To remove last traces of ether and any water that may have accumulated in the product, the vessel was placed in a vacuum desiccator and pumped at 0.1 mm. Hg pressure for 1 hour. The product, a light yellow solid, was evidently a mixture of biimidazoles as evidenced by the following: (1) the infrared spectrum of a dispersion in KBr differed from that of the starting 1,2'-dimer and indicated the presence of at least one other biimidazole along with the starting 1,2'-dimer. For example the shoulder at 6.22 m$\mu$, absent in the original (1,2') spectrum is considered to indicate the presence of the 4,4' isomer. (2) Rubbed with a spatula, a sample developed the purple imidazolyl radical color. In contrast the starting 1,2'-dimer was not so piezochromic, yielding no color under these conditions. (3) Also in contrast to the starting 1,2'-isomer, the above product dissolved in benzene with immediate color formation. The solution was essentially identical in its visible absorption spectrum and color fading value to the colored benzene solution obtained on photolyzing the 1,2'-dimer as described in Example VII, showing that the different biimidazoles dissociate to the same imidazolyl radical.

The proportion of the above biimidazole product that dissociates to radicals in solution at room temperature and that is considered to be the 4,4'-isomer was determined to be 8.4% as follows: 2 mg. (3.2×10⁻⁶ mole) was added to 10 ml. of ethanol containing 4×10⁻⁶ moles of the leuco dye, tris (4-N,N-diethylamino - 2 - methylphenyl) methane, and 1.05×10⁻⁵ moles of p-toluenesulfonic acid. Color characteristic of triarylmethane dye (D⁺ in the equation below) formed immediately. The amount produced from the leuco (DH) was determined spectrophotometrically and was related to the amount of biimidazole (LL) that dissociated into imidazolyl radicals (L) according to the stoichiometry

LL→2L·
2L·+DH+H⁺→2LH+D⁺

In contrast, the starting 1,2'-isomer which does not dissociate spontaneously in ethanol produces no color during 24 hours under the same conditions.

Substantially similar results were obtained in the above experiments on replacing the o-fluoro compound with other biimidazoles, namely 2,2'-bis(o-methylphenyl) 4,4',5,5'-tetraphenyl-1,2'-biimidazole;
2,2'-bis (o-chlorophenyl)-4,4'-5,5'-tetra(m-methoxyphenyl)-1,2'-biimidazole;
2,2'-bis(o-bromophenyl)-4,4',5,5'-tetraphenyl-1,2'-biimidazole.

In each case, there was obtained a mixture of biimidazoles which contained at least one other isomer in addition to the 1,2'-isomer, including the 4,4'-isomer (thermally dissociable at room temperature in solution).

EXAMPLE X

This example further illustrates the surprisingly fast color fading of the ortho-substituted imidazolyl radicals of this invention. Various invention compounds, as listed below and prepared as in the preceding examples, were compared in the color fading test procedure described under Example I with analogously substituted position isomers, also prepared by the Example I method. The results are tabulated below in Table VII.

TABLE VII.—COLOR FADING OF SUBSTITUTED TRIPHENYL IMIDAZOLYL RADICALS IN BENZENE AT ROOM TEMPERATURE

| 2-phenyl | 4-phenyl | 5-phenyl | Color fading value |
|---|---|---|---|
| None | None | None | .46 |
| o-Methyl | | | 3.5 |
| p-Methyl | | | .22 |
| o-Chloro | | | 7.3 |
| p-Chloro | | | .41 |
| | o-Chloro | | .20 |
| o-Bromo | | | 7.4 |
| p-Bromo | | | .36 |
| o-Fluoro | | | 6.2 |
| p-Fluoro | | | .46 |
| o-Methoxyl | | | 7.7 |
| p-Methoxyl | | | .092 |
| o-Methoxyl | p-Methoxyl | | 1.61 |
| p-Methoxyl | do | | .043 |
| o-Methoxyl | do | p-Methoxyl | .50 |
| p-Methoxyl | do | do | .0077 |
| o-CH₃O, m-CH₃O | | | 3.42 |
| o-CH₃O, p-CH₃O | | | .82 |
| m-CH₃O, p-CH₃O | | | .091 |
| o-, m-Benzo | | | 1.2 |
| m-, p-Benzo | | | .81 |

Table VII shows that with respect to the important color fading rate property the ortho-substituted products of this invention outperform analogously substituted isomers which essentially differ only in the position of the substituent on the indicated phenyl group of the imidazolyl radical.

EXAMPLE XI

This example illustrates the comparatively high resistance to thermal color change of representative invention dimers. All the compounds tabulated below in Table VIII were prepared by the method described in Example I so that they essentially differed only in being isomers with respect to the position of the indicated substituent in the 2-phenyl group of the imidazolyl radical. The procedure involved heating the biimidazole under test to 110° C. and observing its color

TABLE VIII.—THERMOTROPY OF SUBSTITUTED 2-PHENYL-4,5-DIPHENYL IMIDAZOLYL DIMERS

| 2-phenyl substituent | Original dimer color | Color change on heating to 110° C. |
|---|---|---|
| o-Methoxy | Pale green | None. |
| o,m-Dimethoxy | Light yellow | Do. |
| o,p-Dimethoxy | Pale green | Do. |
| p-Methoxy | Light green | Dark green. |

The data show that the invention compounds containing an ortho-methoxy group undergo no color change while the para-methoxy compound is thermotropic and rapidly darkens on heating under the conditions of the test. The o-methoxy's stabilizing effect is particularly remarkable in the o,p-dimethoxy compound wherein the o-methoxy completely suppresses the p-methoxy's inherently adverse effect.

UTILITY

As previously stated, all the compositions of this invention are useful in sun shield or shade applications, either dispersed in a solid or liquid, or as the interlayer of a laminate. Preferably the binder, solvent or laminate is transparent, as for example clear glass or plastic. Specific applications include automobile windshields, spectacle lenses, and the like.

For example, a solution of dimethyl formamide containing 10% by weight of cellulose acetate (essentially completely acetylated) and 0.1% by weight of 2,2'-bis(o-chlorophenyl)-4,4',5,5'-tetraphenyl-1,2' - biimidazole prepared as described in Example I was spread on a glass plate and dried by the application of mild heat from an infrared heat lamp utilizing sufficient ventilation. The glass plate was placed in a window frame and when illuminated in the sunlight a pleasing pink color quickly developed. The glass plate reverted to its essentially colorless state in a matter of seconds when the source of illumination was not present.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A composition of matter selected from the class consisting of
   (A) a light-stable imidazolyl maintained under the influence of ultraviolet light represented by the formula

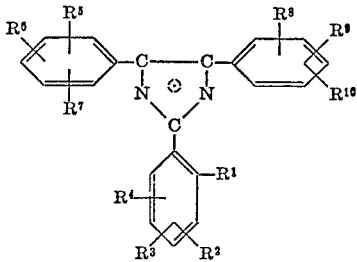

wherein
   $R^1$ has a sigma value below 0.7 and is selected from lower alkyl, lower alkoxy, lower alkoxycarbonyl, lower alkylthio, di(lower alkyl)-carbamoyl, di(lower alkyl)sulfamoyl, lower alkanoyloxy, N-lower alkyl-lower alkanamido, phenyl, naphthyl, phenyloxy, naphthyloxy, phenylthio, naphthylthio, halo or cyano;
   $R^2$ through $R^{10}$ are each individually, selected from hydrogen, lower alkyl, lower alkoxy, lower alkoxycarbonyl, lower alkylthio, di(lower alkyl)carbamoyl, di(lower alkyl)sulfamoyl, lower alkanoyloxy, N-lower alkyl-lower alkanamido, phenyl, naphthyl, phenyloxy, naphthyloxy, phenylthio, naphthylthio, halo or cyano;
   and any two $R^1$ through $R^{10}$ substituents in adjacent positions on the same phenyl ring of the above formula can be joined together to form a —CH=CH— group; and
   with the proviso that only one of $R^5$ through $R^7$ and only one of $R^8$ through $R^{10}$ can be in a position ortho to the phenyl carbon that is attached to the imidazolyl nucleus of the above formula;
   said imidazolyl having an unpaired delocalized electron and having four electrons paired; and
   said imidazolyl being maintained upon the surface of an inert substrate or in solution in a solvent that is inert to said imidazolyl;
   and
   (B) dimers thereof, said dimers having the property of forming color in solution in an inert solvent upon exposure to ultraviolet radiation corresponding to the ultraviolet light absorption spectrum of the dimer, which color fades upon removal of the radiation.

2. A composition of matter consisting essentially of
   (A) a light-stable imidazolyl; and
   (B) an inert substrate or a solvent inert to said imidazolyl;
said composition being maintained under the influence of ultraviolet light and said imidazolyl being maintained upon the surface of said substrate or in solution in said solvent; said imidazolyl being represented by the formula

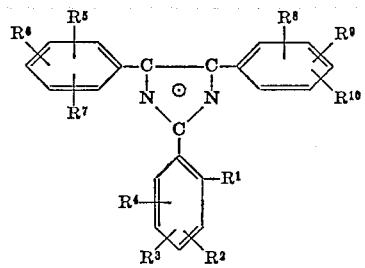

wherein
   $R^1$ has a sigma value below 0.7 and is selected from lower alkyl, lower alkoxy, lower alkoxycarbonyl, lower akylthio, di(lower alkyl)-carbamoyl, di(lower alkyl)sulfamoyl, lower alkanoyloxy, N-lower alkyl-lower alkanamido, phenyl, naphthyl, phenyloxy, naphthyloxy, phenylthio, naphthylthio, halo or cyano;
   $R^2$ through $R^{10}$ are each individually selected from hydrogen, lower alkyl, lower alkoxycarbonyl, lower alkylthio, di(lower alkyl)carbamoyl, di(lower alkyl) sulfamoyl, lower alkanoyloxy, N-lower alkyl-lower alkanamido, phenyl, naphthyl, phenyloxy, naphthyloxy, phenylthio, naphthylthio, halo or cyano; and
   any two $R^1$ through $R^{10}$ substituents in adjacent positions on the same phenyl ring of the above formula can be joined together to form a —CH=CH— group; and
   with the proviso that only one of $R^5$ through $R^7$ and only one of $R^8$ through $R^{10}$ can be in a position ortho to the phenyl carbon that is attached to the imidazolyl nucleus of the above formula; and
   said imidazolyl having an unpaired delocalized electron, and having four electrons paired.

3. The light-stable imidazolyl of claim 2 wherein $R^1$ is selected from the class consisting of lower alkyl, lower alkoxy, chloro, bromo and fluoro; and $R^2$ through $R^{10}$ are each selected from the class consisting of $R^1$ and hydrogen.

4. The light-stable imidazolyl of claim 3 wherein $R^2$ through $R^{10}$ are each hydrogen.

5. The composition of matter of claim 2 having the chemical name 2-(o-chlorophenyl)-4,5-diphenyl imidazolyl.

6. The composition of matter of claim 2 having the chemical name 2-(2,4-dichlorophenyl)-4,5-diphenyl imidazolyl.

7. The composition of matter of claim 2 having the chemical name 2-(o-methoxyphenyl)-4,5-diphenyl imidazolyl.

8. The composition of matter of claim 2 having the chemical name 2-(o-bromophenyl)-4,5-diphenyl imidazolyl.

9. The composition of matter of claim 2 having the chemical name 2-(o-fluorophenyl)-4,5-diphenyl imidazolyl.

10. The composition of matter of claim 2 having the chemical name 2-(2,3-dimethoxyphenyl)-4,5-diphenyl imidazolyl.

11. The composition of matter of claim 2 having the chemical name 2-(o-chlorophenyl) - 4,5 - bis(m-methoxyphenyl) imidazolyl.

12. The composition of matter of claim 2 having the chemical name 2-(o-chlorophenyl)-4,5-bis(m-methylphenyl) imidazolyl.

13. The composition of matter of claim 2 having the chemical name 2-(o-methoxyphenyl)-4,5-bis(p-methoxyl) phenyl imidazolyl.

14. A composition of matter represented by the formula

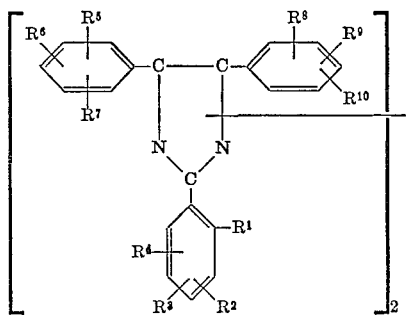

wherein
$R^1$ has a sigma value below 0.7 and is selected from lower alkyl, lower alkoxy, lower alkoxycarbonyl, lower alkylthio, di(lower alkyl)carbamoyl, di(lower alkyl)sulfamoyl, lower alkanoyloxy, N-lower alkyl lower alkanamido, phenyl, naphthyl, phenyloxy, naphthyloxy, phenylthio, naphthylthio, halo or cyano;

$R^2$ through $R^{10}$ are each individually selected from hydrogen, lower alkyl, lower alkoxy, lower alkoxycarbonyl, lower alkylthio, di(lower alkyl)carbamoyl, di(lower alkyl) sulfamoyl, lower alkanoyloxy, N-lower alkyl lower alkanamido, phenyl, naphthyl, phenyloxy, naphthyloxy, phenylthio, naphthylthio, halo or cyano;

any two $R^1$ through $R^{10}$ substituents in adjacent positions on the same phenyl ring of the above formula can be joined together to form a —CH=CH— group;

with the proviso that only one of $R^5$ through $R^7$ and only one of $R^8$ through $R^{10}$ can be in a position ortho to the phenyl carbon that is attached to the imidazolyl nucleus of the above formula; and wherein the two imidazolyl rings are joined through a single bond and the remaining valences of the 3 carbon atoms and the 2 nitrogen atoms of each ring are satisfied by 2 conjugated double bonds; and wherein said composition has the property of forming color in solution in an inert solvent upon exposure to ultraviolet irradiation corresponding to the ultraviolet light absorption spectrum of the composition, which color fades upon removal of the radiation.

15. The composition of claim 14 wherein $R^1$ is lower alkyl, lower alkoxy, chloro, bromo or fluoro; and $R^2$ through $R^{10}$ are each selected from $R^1$ or hydrogen.

16. The composition of claim 15 wherein $R^2$ through $R^{10}$ are each hydrogen.

17. The composition of claim 15 wherein $R^1$ is defined as in claim 15; $R^2-R^6$ and $R^9-R^{10}$ are each hydrogen, and $R^7$ and $R^8$ are each meta-alkoxy groups of 1–6 carbon atoms.

18. A composition of matter represented by the formula

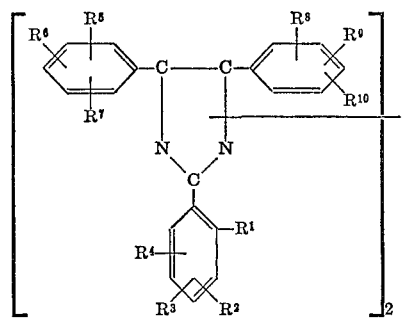

wherein
the two imidazolyl rings of the above formula are joined at either the 1–2' or 4–4' positions of said rings, and the remaining valences of the 3 carbon atoms and the 2 nitrogen atoms of each ring are satisfied by 2 conjugated double bonds;

$R^1$ is selected from lower alkyl, lower alkoxy, lower alkoxycarbonyl, lower alkylthio, di(lower alkyl)carbamoyl, di(lower alkyl)sulfamoyl, lower alkanoyloxy, N-loweralkyl lower alkanamido, phenyl, naphthyl, phenyloxy, naphthyloxy, phenylthio, naphthylthio, halo or cyano;

$R^2$ through $R^{10}$ are each individually selected from hydrogen, lower alkyl, lower alkoxy, lower alkoxycarbonyl, lower alkylthio, di(lower alkyl)carbamoyl, di-lower alkyl)sulfamoyl, lower alkanoxyloxy, N-lower alkyl lower alkanamido, phenyl, naphthyl, phenyloxy, naphthyloxy, phenylthio, naphthylthio, halo or cyano;

any two $R^1$ through $R^{10}$ substituents in adjacent positions on the same phenyl ring of the above formula can be joined together to form a —CH=CH— group;

with the proviso that only one of $R^5$ through $R^7$ and only one of $R^8$ through $R^{10}$ can be in a position ortho to the phenyl carbon that is attached to the imidazolyl nucleus of the above formula; and wherein said composition has the property of forming color in solution in an inert solvent upon exposure to ultraviolet irradiation corresponding to the ultraviolet light absorption spectrum of the composition, which color fades upon removal of the radiation.

19. The composition of claim 18 wherein $R^1$ is lower alkyl, lower alkoxy, chloro, bromo or fluoro; and $R^2$ through $R^{10}$ are each selected from $R^1$ or hydrogen.

20. The composition of claim 19 wherein $R^2$ through $R^{10}$ are each hydrogen.

21. The composition of claim 18 wherein the two imidazolyl rings are joined at the 1–2' positions of said rings.

22. The composition of claim 21 wherein $R^1$ is lower alkyl, lower alkoxy, chloro, bromo or fluoro; and $R^2$ through $R^{10}$ are each selected from $R^1$ or hydrogen.

23. The composition of claim 22 wherein $R^2$ through $R^{10}$ are each hydrogen.

24. The composition of matter of claim 21 having the chemical name 2,2' - bis(o - chlorophenyl)-4,4',5,5'-tetraphenyl-1,2'-biimidazole.

25. The composition of matter of claim 21 having the chemical name 2,2' - bis(2,4 - dichlorophenyl)-4,4',5,5'-tetraphenyl-1,2'-biimidazole.

26. The composition of matter of claim 21 having the chemical name 2,2'-bis(o-methoxyphenyl) - 4,4',5,5'-tetraphenyl-1,2'-biimidazole.

27. The composition of matter of claim 21 having the chemical name 2,2'-bis(o-bromophenyl)-4,4',5,5'-tetraphenyl-1,2'-biimidazole.

28. The composition of matter of claim 21 having the chemical name 2,2'-bis(o-fluorophenyl) - 4,4',5,5' - tetraphenyl-1,2'-biimidazole.

29. The composition of matter of claim 21 having the chemical name 2,2'-bis(2,3-dimethoxyphenyl)-4,4',5,5'-tetraphenyl-1,2'-biimidazole.

30. The composition of matter of claim 21 having the chemical name 2,2'-bis(o-chlorophenyl)-4,4',5,5'-tetrakis(m-methoxyphenyl)-1,2'-biimidazole.

31. The composition of matter of claim 21 having the chemical name 2,2'-bis(o-chlorophenyl)-4,4',5,5'-tetrakis(m-methylphenyl)-1,2'-biimidazole.

32. The composition of matter of claim 21 having the chemical name 2,2'-bis(o-methoxyphenyl)-4,4',5,5'-tetrakis(p-methylphenyl)-1,2'-biimidazole.

33. A phototropic composition comprising the photodissociable imidazolyl dimer and the light-stable imidazolyl radical in reversible equilibrium in an inert solvent according to the equation and structures set forth as follows:

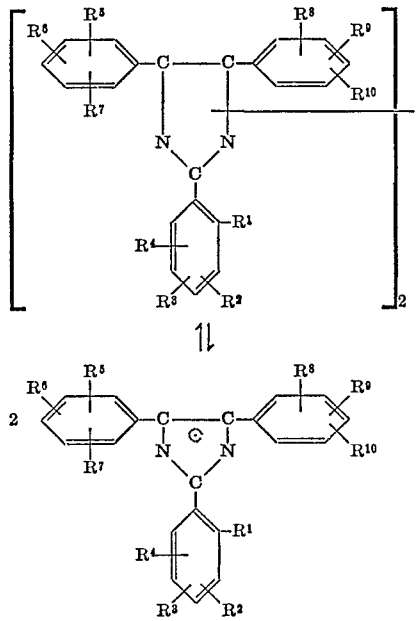

wherein
$R^1$ has a sigma value below 0.7 and is selected from lower alkyl, lower alkoxy, lower alkoxycarbonyl, lower alkylthio, di(lower alkyl)carbamoyl, di(lower alkyl)sulfamoyl, lower alkanoyloxy, N-lower alkyl lower alkanamido, phenyl, naphthyl, phenyloxy, naphthyloxy, phenylthio, naphthylthio, halo or cyano;

$R^2$ through $R^{10}$ are each individually selected from hydrogen, lower alkyl, lower alkoxy, lower alkoxycarbonyl, lower alkylthio, di(lower alkyl)carbamoyl, di(lower alkyl)sulfamoyl, lower alkanoyloxy, N-lower alkyl lower alkanamido, phenyl, naphthyl, phenyloxy, naphthyloxy, phenylthio, naphthylthio, halo or cyano; and any two $R^1$ through $R^{10}$ substituents in adjacent positions on the same phenyl ring in the above formulas can be joined together to form a —CH=CH— group;

with the proviso that only one of $R^5$ through $R^7$ and only one of $R^8$ through $R^{10}$ can be in a position ortho to the phenyl carbon that is attached to the imidazolyl nucleus of the above formulas;

and wherein the two imidazolyl rings of said dimer are joined through a single bond and the remaining valences of the 3 carbon atoms and the 2 nitrogen atoms of each ring are satisfied by 2 conjugated double bonds;

and wherein said radical has an unpaired delocalized electron and four electrons paired;

and wherein said composition has a characteristic color when irradiated with dissociating irradiation which color disappears on cessation of the irradiation.

References Cited
UNITED STATES PATENTS 3,205,083  9/1965  Green _____ 260—309

FOREIGN PATENTS 585,555  4/1960  Belgium _____ 260—309

OTHER REFERENCES

Deliwala et al.: Chem. Abst., vol. 45, columns 6177–8 (1951).

Gould: Mechanism and Structure in Organic Chemistry, pp. 672–82, New York, Holt, 1959.

Hayashi et al.: Bul. Chem. Soc. (Japan), vol. 33, pp. 565–6 (1960).

Neugebauer et al.: German application 1,106,599, May 1961 (KL. 57b 10), 7 pages spec., 2 pages drawing.

Radziszewski: Chem. Abst., vol. 4, pp. 2265–6 (1910).

Zimmermann et al.: Angew. Chem., vol. 73, p. 808 (1961).

NATALIE TROUSOF, Primary Examiner

U.S. Cl. X.R.

65—30, 60; 117—33.3, 124 D; 252—300